Patented Aug. 7, 1923.

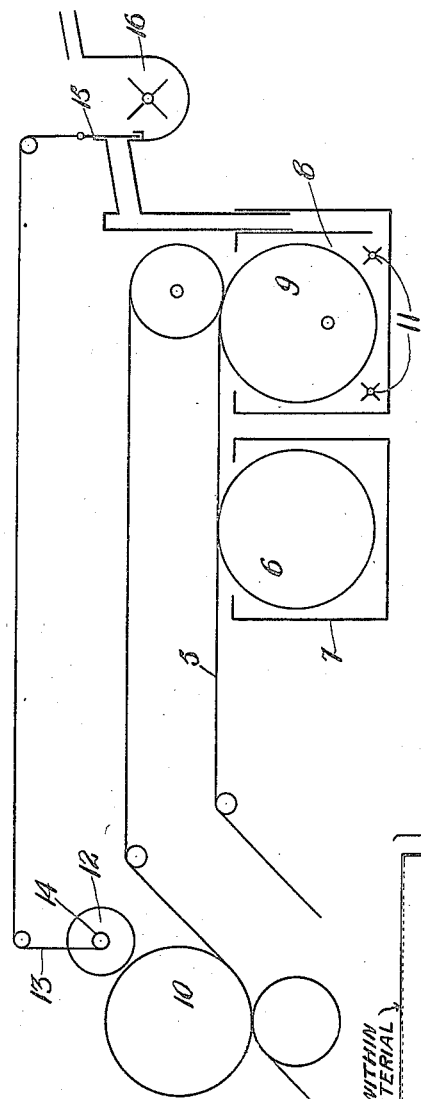
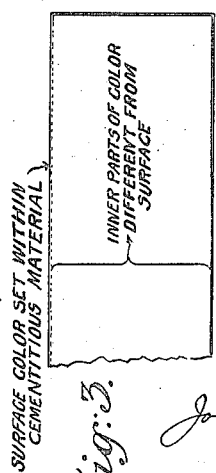
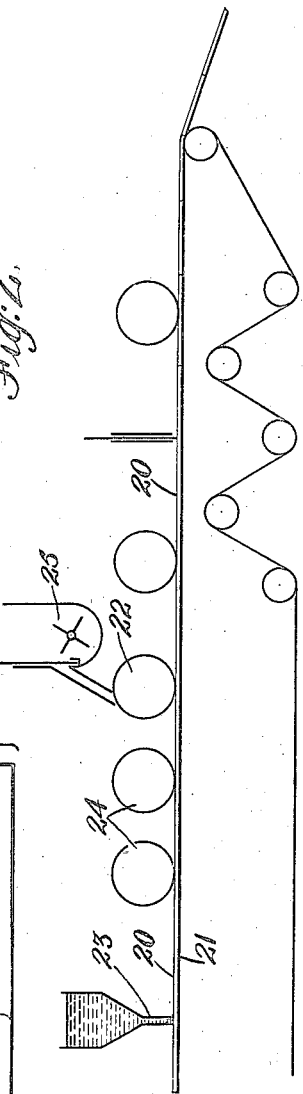

1,463,961

UNITED STATES PATENT OFFICE.

JOHN W. LEDEBOER, OF AMBLER, PENNSYLVANIA, ASSIGNOR TO ASBESTOS SHINGLE, SLATE & SHEATHING COMPANY, A CORPORATION OF PENNSYLVANIA.

COLORED CEMENT COMPOSITION AND METHOD FOR PREPARING THE SAME.

Application filed December 18, 1919. Serial No. 345,855.

*To all whom it may concern:*

Be it known that I, JOHN W. LEDEBOER, citizen of the United States, residing at Ambler, in the county of Montgomery and State of Pennsylvania, have invented certain new and useful Improvements in Colored Cement Composition and Methods for Preparing the Same, of which the following is a specification.

This invention relates to hydraulic cement and fiber composition material and particularly to such material as a composition stone-like product colored on the surface and to a process for making the same. It is especially applicable to products of hydraulic cement and fibrous material such as asbestos, in slab or sheet form as frequently used in builders' boards, shingles, artificial slate, etc. For many uses the natural grey color of the cement composition is undesirable and coloring matter has been mixed with the composition to give the desired shade of red, green, blue, etc. Such coloring matter thus diffused through the mass is expensive and its presence in the composition detracts from the strength of the latter.

The object of this invention is to provide a cement-fiber composition sheet or slab having a colored surface attained with a minimum amount of coloring matter and without weakening the sheet or slab. With this object in view the coloring of this invention is applied to the composition in such form and at such time in the formation of the composition that the desired coloring will be confined to the surface of the final product.

In the accompanying drawings illustrating ways of producing the composition of this invention, Fig. 1 is a diagram illustrating the process and an apparatus adapted to practice the invention as applied to the building up of the product, Fig. 2 is a diagram illustrating modifications, and Fig. 3 is a sectional view of the product drawn to a relatively large scale.

The product of this invention comprises a body of set hydraulic cement and fibrous material such as asbestos in finely divided form, and this body has a desired surface coloring integral in the composition. In the formation of this product the cement and asbestos materials are mixed together with water and worked into desired form. During this working and before the cement is set and preferably while the materials are freshly wetted the coloring matter is applied to those portions of the mass that will be surfaces in the final product. These surfaces thus colored are an integral part of the cement asbestos composition and the coloring is so applied during the working that it is confined to the surface and is not spread throughout the interior of the composition. Preferably the wetting and formation of the composition is begun and carried far enough to provide fresh surfaces of known relation to the final product and on these surfaces the coloring matter is laid in a manner forming a thin opaque coloring merging into and integral with the mass of the composition. The coloring such as red oxide of iron in finely divided form may be directly deposited on the wet surfaces of the cement asbestos mixture and then worked into the plastic surface thereof or may be applied in wet form to the surface to be colored. In either case it may be advantageous to mix with the coloring matter finely divided cement or cement and asbestos to assure the same character of material in the surface and form a firm and integral bond between the surface material and the body of the composition. Such composite coloring matter is particularly advantageous when the material is applied wet as it permits the coloring to be added as freshly wetted and newly formed asbestos cement material similar in character to the surface to which it is applied and readily and integrally merging therewith.

In the apparatus shown in Fig. 1 and illustrating one means for carrying the invention into effect a belt 5 has its lower surface in contact with drum 6 rotating in vat 7 containing the cement asbestos material mixed with water. When there is sufficient material of the desired consistency in the vat this drum will deposit a film or layer of the material on the under surface of the belt 5 which carries this film around to rotary collecting cylinder 10 upon which the material is built up by successive rotations into the desired thickness. The material so built up is cut and stripped from the cylinder and pressed in a hydraulic press and allowed to set. To color the surface of the ultimate product a second vat 8 is provided having a drum 9 and containing coloring matter in form for deposit on the under surface of the film already adhering to the belt 5. This coloring matter may either color the film on the belt or be applied as another surface adhering to the prior film. For instance in the latter case the material in vat 8 may be asbestos cement material mixed with a color such as red oxide of iron and kept stirred by agitators 11. This material will pass from drum 9 onto the fresh film from vat 7 and at the cylinder 10 will be pressed in direct contact with the surface of the cylinder and form a smooth surface coloring when the built up layers are stripped and pressed in a hydraulic press and then allowed to set.

In the type of apparatus shown in Fig. 1 the feeding of color from drum 9 is preferably intermittent and confined to that portion of the film lying next to the cylinder 10. This coloring may therefore appear only on the surface of the final product the interior of which is uncolored. The interrupting of the color feed may be done by hand means, or automatically as for instance by lowering the level of the coloring matter in vat 8 by control of the feed thereto. One example of automatic control is shown, consisting of a roll 12 spaced from cylinder 10 whereby when the material on the cylinder has built up to a certain thickness roll 12 will be rotated to wind up string 13 on the roll axle 14 and raise gate 15 for a small increment of the coloring material to flow from mixer 16 into vat 8 raising the level therein so that drum 9 will carry the color up to the belt 5. The built up material will be stripped from cylinder 10 just in advance of the new colored film which will thus be fed directly on to the surface of the cylinder. The stripping of the built up sheet from roll 10 allows roller 12 to drop back and thus automatically closes gate 15 and the feed from drum 9 lowering the level in vat 8 so that the feed therefrom automatically discontinues at the proper time, confining the coloring to the surface of the final product.

The opposite surface of the product may also be colored, if desired, by permitting the colored film to feed onto the end of the material on the cylinder just before stripping and at the same time interrupting the other film.

Where as illustrated in Fig. 2 the unset material is available in a continuous strip 20 on a belt 21 the color film may be applied to the surface of the material from above as by roller 22. In this apparaus the cement and fibrous material is not built up in layers but is fed directly onto the belt 21 in dry or plastic form and then spread out and rolled into the desired thickness. Where material is fed dry onto the belt it will preferably be wetted as at 23 and then surfaced as by roll 24 before the color is applied by roller 22, after which the material may be again rolled and then cut and stripped from the belt and pressed and allowed to set. In the specific means shown the coloring material in wet form is fed from mixer 25 onto the surface of roller 22 and from there is deposited on the surface of the asbestos cement strip 20.

The application of the color to the surface of the freshly wetted asbestos cement material gives a strong bond between the color and the body of the composition forming the whole into a unitary integral mass, while the separate formation of the uncolored strip confines the coloring to the surfaces. The coloring matter is usually very expensive and great saving is effected in reducing the amount used while at the same time the natural strength of the cement asbestos composition is retained without adding to the overall thickness. The colored surface is a thoroughly integral part of the complete strip and is without tendency to chip or scrape off or cause warping or distortion of the strip as a whole, as is the case, for instance, where it is attempted to combine together two differently colored slabs in one piece.

While the invention has been particularly described in connection with specific embodiments it is not confined thereto but is intended to cover such modifications as fall within the scope of the appended claims.

I claim:—

1. A product comprising a sheet or slab having an interior body portion of fibre and set hydraulic cement having a characteristic color, and a surface film of cementitious material and coloring matter having a color different from that of said body portion homogeneously mixed throughout said film which is pressed together with said body portion and set therewith as a solid, integral mass having its interior of one color and its surface film of a different color.

2. A product comprising a sheet or slab having an interior body portion of fibre and set hydraulic cement having a natural characteristic grey color and a surface film of cementitious material and coloring matter having a color different from that of said body portion homogeneously mixed throughout said film which is pressed together with said body portion and set therewith as a solid, integral mass having its interior of one color and its surface film of a different color.

3. A product comprising a sheet or slab having an interior body portion of homogeneously mixed fibre and set hydraulic cement having a characteristic color, and a surface film of hydraulic cement and fibre and coloring matter having a color different from that of said body portion, said coloring matter being homogeneously mixed with said cement and fibre throughout said film which is pressed together with said body portion and set therewith as a solid, integral mass having its interior of one color and its surface film of a different color.

4. The process which comprises working up a mixture of hydraulic cement, water and fibrous material into the form of a sheet or slab and determining the surface parts of the same, then applying to the surface parts a previously made film comprising a cementitious composition containing a coloring matter having a color different from that of the body of the composition, subjecting the sheet or slab to pressure and allowing the whole to set as a solid, integral mass having its interior of one color and its surface film of another color.

5. The process which comprises working up a mixture of hydraulic cement, water and fibrous material into the form of a sheet or slab and determining the surface parts of the same, then applying to the surface parts a previously made film comprising a similar composition containing a coloring matter having a color different from that of the body of the composition, subjecting the sheet or slab to pressure and allowing the whole to set as a solid, integral mass having its interior of one color and its surface film of another color.

JOHN W. LEDEBOER.